US006205957B1

United States Patent
Saylor

(10) Patent No.: US 6,205,957 B1
(45) Date of Patent: Mar. 27, 2001

(54) NATURAL GAS ENGINE WITH IN SITU GENERATION OF AN AUTOIGNITION PRODUCT

(75) Inventor: William W. Saylor, Gunnison, CO (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/397,692

(22) Filed: Sep. 16, 1999

(51) Int. Cl.[7] ........................................ F02B 43/00
(52) U.S. Cl. .................... 123/3; 123/27 GE; 123/527
(58) Field of Search ....................... 123/1 A, 3, 27 GE, 123/525, 526, 527; 44/447, 457; 585/14

(56) References Cited

U.S. PATENT DOCUMENTS

| 4,098,809 | * | 7/1978 | Pagani | 518/713 |
| 4,417,000 | | 11/1983 | Slaugh et al. | 518/713 |
| 5,218,003 | * | 6/1993 | Lewnard et al. | 518/700 |
| 5,245,110 | * | 9/1993 | Dijk et al. | 585/733 |
| 5,459,166 | * | 10/1995 | Lee et al. | 518/700 |
| 5,485,818 | * | 1/1996 | McCandles | 123/294 |
| 5,502,243 | * | 3/1996 | Waller et al. | 560/232 |
| 5,714,662 | * | 2/1998 | Vora et al. | 585/640 |
| 5,753,716 | * | 5/1998 | Peng et al. | 518/700 |
| 5,908,963 | * | 6/1999 | Voss et al. | 568/671 |

FOREIGN PATENT DOCUMENTS

| 0 761 942 A1 | 12/1997 | (EP) . |
| WO 96/23755 | 8/1996 | (WO) . |

* cited by examiner

Primary Examiner—Willis R. Wolfe
Assistant Examiner—Hai Huynh
(74) Attorney, Agent, or Firm—Daniel S. Kalka; Roger A. Johnston

(57) ABSTRACT

An apparatus and method for generating an autoignition substance such as DME for operating a diesel-type engine 12 with natural gas. A multi-stage reformer 18 is connected to a supply of natural gas 20 to receive a portion therefrom for production of an autoignition substance for supply to the microigniters 14 within a diesel-type engine 12. An engine control unit 24 in communication with a microcontroller 22 receives signals from sensors within the engine 12 and multi-stage reformer 18 for optimizing engine performance and generation of autoignition substances thereto. The apparatus and method of the present invention allows the operation of a diesel-type engine with natural gas as the primary or even the sole fuel by providing an autoignition substance in situ.

19 Claims, 4 Drawing Sheets

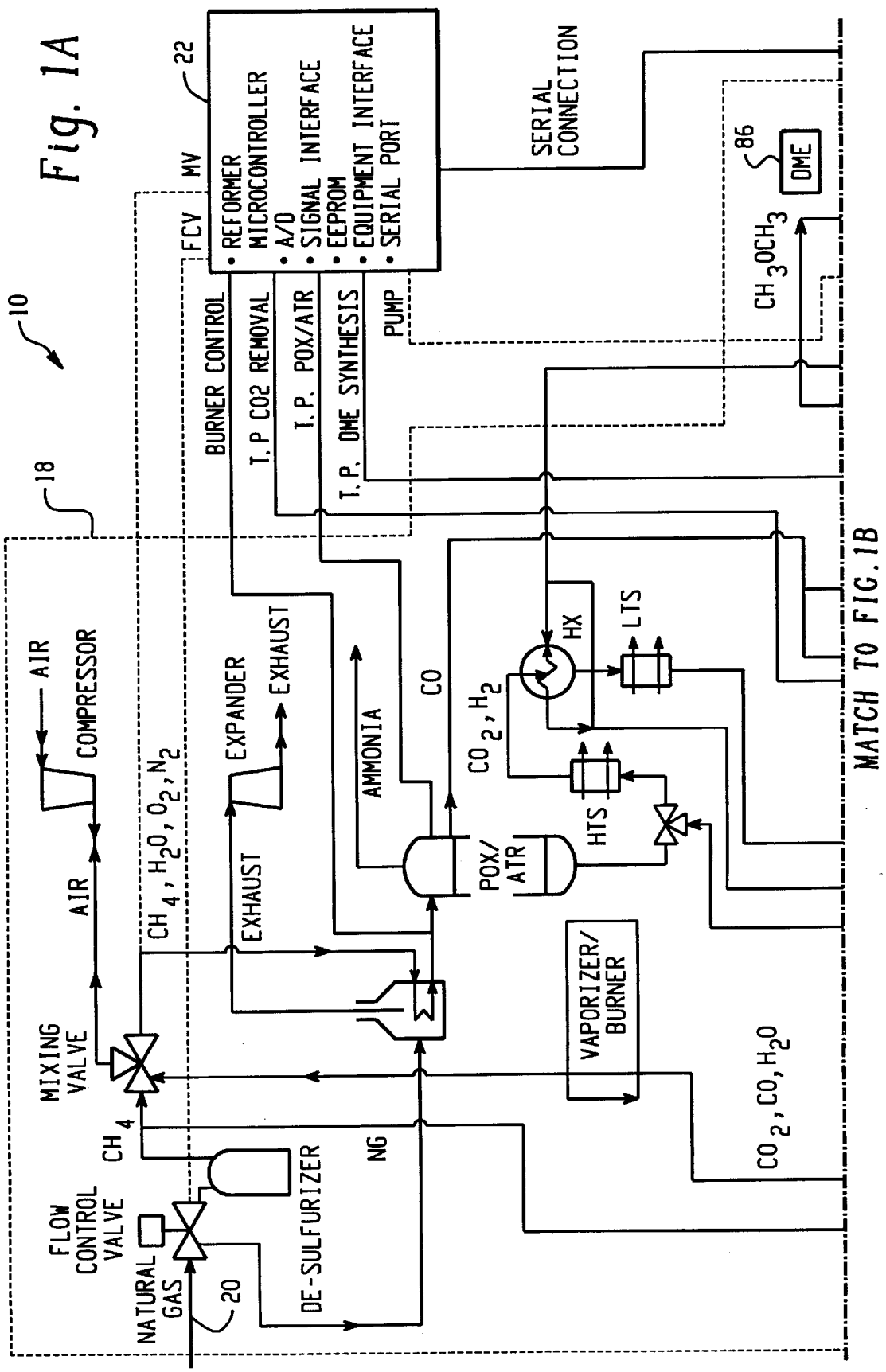

NATURAL GAS ENGINE WITH IN SITU GENERATION OF AN AUTOIGNITION PRODUCT

BACKGROUND OF THE INVENTION

1. Field of the Invention

The present invention relates in general to a natural gas engine, and more specifically to an apparatus and method for operating a natural gas engine with in situ generation of an autoignition substance.

2. Description of the Related Art

Natural gas engines produced and operating around the world typically use a spark ignition source to ignite the natural gas in the engine cylinder. This technology limits the achievable performance of an engine using natural gas as the fuel source since the spark does not volumetrically ignite the natural gas. There are typically regions of "too rich" and "too lean" gas mixtures within the cylinder. This causes incomplete combustion and inefficiency. The result is unburned gases in the exhaust stream, and this can mean that the engine efficiency has been reduced. In addition, the regions of "too lean" gas mixture may cause production of nitrogen oxides ($NO_x$), sulfur oxides ($SO_x$), and other pollutants. Attempts to increase the brake mean effective pressure (BMEP) in natural gas engines with spark ignition are limited by considerations of engine knock as well as $NO_x$ emissions. Also, increasing the cylinder pressure makes the spark ignition problem more difficult. Higher spark voltages are required and this leads to more tip erosion on the spark igniter.

It is known that an autoignition fuel can be used in a micropilot fuel injector in place of a spark source to cause better combustion of the natural gas in the engine cylinder. Previous work concentrated on the use of diesel fuel as the autoignition fuel. The quantity of diesel fuel required is typically between 0.1% and 5% of the quantity of natural gas on a volumetric basis.

It is believed that there are no commercially successful implementations of this concept, because of concerns with the performance of the micro pilot injectors as well as maintaining two separate sources of fuel, i.e., natural gas and diesel fuel.

It is also known that dimethyl ether (DME) has excellent autoignition properties. It has a cetane number higher than diesel fuel with similar hydrodynamic properties. From a thermophysical perspective, DME is similar to liquid natural gas (LNG) in that it is a gas at standard temperature and pressure. At room temperature, approximately six atmospheres (atm) of pressure are required to liquefy DME. Continuing research and development programs are underway in the United States, Europe, and Japan in attempting to develop engines and fuel systems that operate on 100% DME. These programs are directed to substituting DME for diesel fuel oil in diesel engines that operate on 100% diesel fuel.

PCT Application No. WO96/23755 is directed to a process for the preparation of fuel grade dimethyl ether from synthesis gas.

U.S. Pat. No. 4,417,000 relates to a process for making dimethyl ether from syngas.

Of interest is European Patent Application EP 0 761 942A1 which describes a process for generating power in a gas turbine cycle using dimethyl ether and/or methanol as the primary fuel.

There still exists a need for an apparatus and method that allows a diesel-type engine (diesel-type engine as used herein is intended to refer to a diesel cycle engine which does not rely on a spark ignition source as opposed to an Otto cycle engine which does employ a spark source for the cylinder). Preferably, the apparatus and method will generate an autoignition product in situ with a portion of the natural gas intended to be the primary fuel for the engine.

BRIEF SUMMARY OF THE INVENTION

The present invention is directed to solving the aforementioned problems as well as others by providing an apparatus and method for generating an autoignition product for a diesel-type engine with natural gas. A multi-stage reformer connected to a supply of natural gas receives a portion of the natural gas and processes a portion of the natural gas to produce an autoignition substance. A pump connected to the multi-stage reformer receives the autoignition product and supplies the autoignition product to at least one microigniter in a diesel-type engine for ignition during the compression stroke of the engine. A controller connected to and in communication with the multi-stage reformer and the pump receives input signals from the reformer and the pump. In response thereto, the controller sends output signals to the reformer to generate a set amount of the autoignition product and then via the pump supply the autoignition product to the microigniter. A moderate size DME reservoir may also be utilized with the present invention.

The present invention is also directed to a method for producing an autoignition product for a diesel-type engine that uses natural gas as its primary fuel. A multi-stage reformer connected to the supply of natural gas receives a portion of the natural gas and processes a stream therefrom. The multi-stage reformer first forms a synthesis gas in a first reactor stage of the reformer. The next step employs a water-shift reaction to combine carbon monoxide and water in the synthesis gas stream to form carbon dioxide and hydrogen. A second reactor stage removes carbon dioxide from the gas stream. Additional methane is preferably added to the second reactor stage. A third reactor stage synthesizes dimethyl ether (DME) and methanol from the second reactor stage stream with preferably the addition of CO bleed stream. Impurities are separated from the DME and methanol. The fuel pump, responsive to the controller, supplies the DME and methanol mixture to at least one microigniter in at least one cylinder of the diesel-type engine.

The present invention is also directed to operating a diesel-type engine with natural gas using an autoignition product generated in situ. A diesel-type engine is operated on a supply of natural gas with a portion of the natural gas being supplied to a multi-stage reformer. The multi-stage reformer produces an autoignition product, preferably DME, from the process stream received from the multi-stage reformer. A fuel pump connected to the multi-stage reformer supplies the DME to a microigniter in each cylinder of the diesel-type engine for ignition to allow combustion of natural gas in the diesel-type engine. This allows the engine to operate exclusively on natural gas without a spark ignition source.

Accordingly, an object of the present invention is to provide an apparatus for generating an autoignition substance for operating an engine with natural gas.

Another object of the present invention is directed to a method for producing an autoignition substance for an engine.

Still another object of the present invention is to provide a method for operating a diesel-type engine with natural gas using an autoignition product generated in situ.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is described and illustrated.

DETAILED DESCRIPTION OF THE INVENTION

Figure 1B:
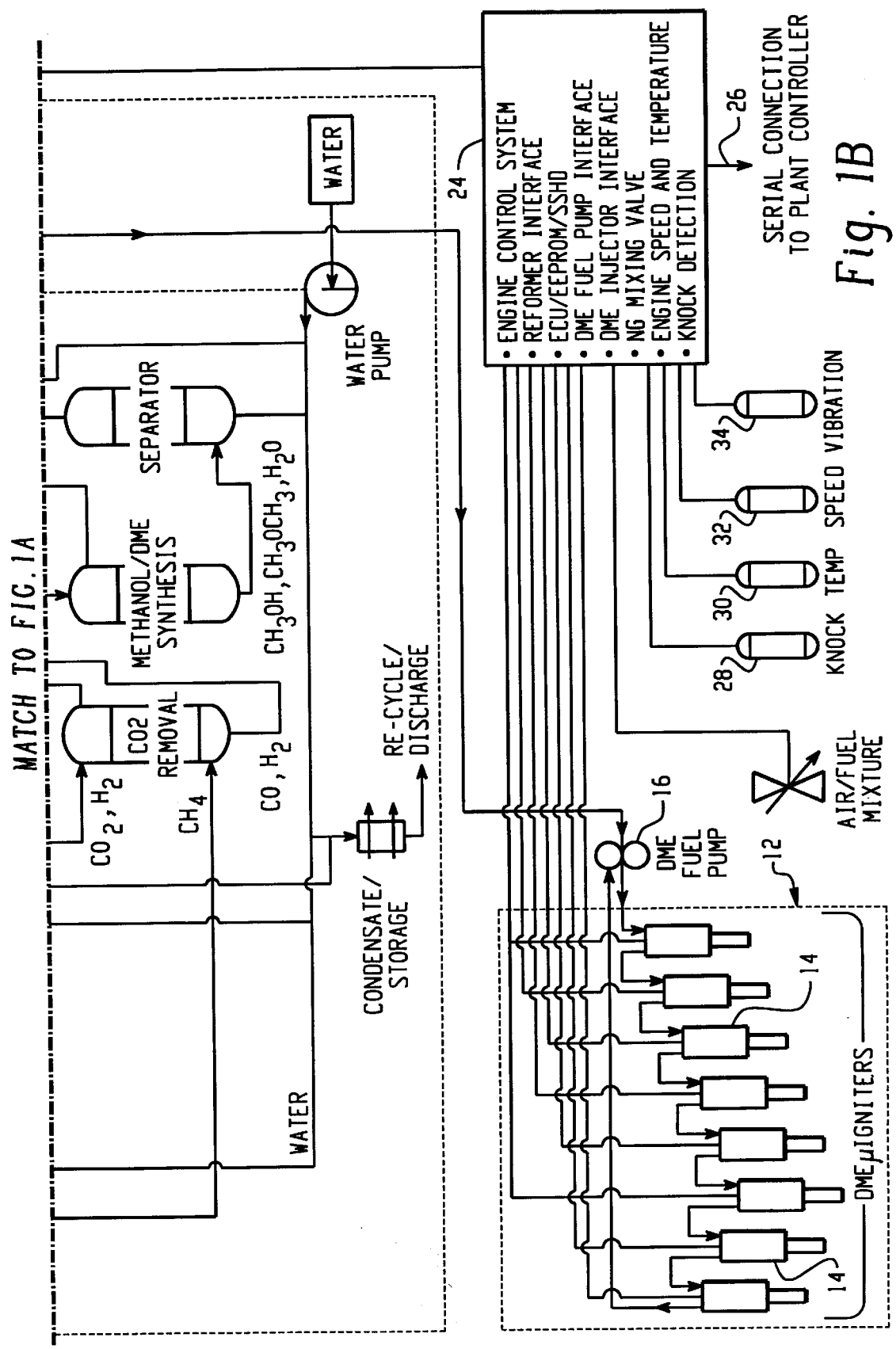
FIG. 1 is a schematic illustration of the apparatus according to the present invention.

Referring to the figures, where like numerals designate like or similar features throughout the several views, and first in particular to FIG. 1, there is shown a schematic illustration of an apparatus generally designated 10 in accordance with the present invention.

Apparatus 10 comprises a system which generates an autoignition product or substance for operating an engine with natural gas. Preferably, the engine is a diesel-type engine which relies on ignition of an autoignition substance during the compression stroke of the engine. A diesel-type engine 12 has a plurality of microigniters 14, preferably one for each cylinder of the engine 12. The microigniter 14 receives the autoignition substance which according to the present invention is derived from natural gas in situ. The autoignition substance derived in situ for the natural gas engine is supplied by way of the autoignition fuel pump 16 into the engine cylinders and ignite during the compression stroke of the engine. The ignition of the autoignition substance causes subsequent ignition of the natural gas charge also injected into the engine cylinders. In this manner, diesel-type engine 12 is operating on a diesel cycle with natural gas as the primary fuel rather than a spark ignition cycle typically found with an Otto cycle. While the most efficient application of the present invention is anticipated to be in a four cycle engine, the present invention can be applied to a two cycle compression ignition engine as well. In the preferred embodiment, the present invention is applicable to a stationary diesel engine, for example, for use in a power plant electrical generation process, but is also applicable to a mobile diesel engine, for example, in vehicle applications or other industrial applications.

Returning to FIG. 1, a multi-stage reformer 18 is connected to a supply of natural gas 20. The natural gas supply 20 may be either (a) compressed natural gas (CNG) or (b) liquid natural gas (LNG). Multi-stage reformer 18 receives a small portion or percentage of the natural gas feed stream which is supplied to operate the engine. Multi-stage reformer 18 through a series of chemical reactions and processes produces an autoignition substance which the primary substance of interest is dimethyl ether (DME). There are several other ether and ether-like compounds formed in the process that also have suitable autoignition properties. Multi-stage reformer 18 is essentially a multi-stage chemical processing reactor that uses combinations of pressure and temperature to control the reaction kinetics of the process. The autoignition substance produced therefrom is supplied to the autoignition fuel pump 16 and from there to the microigniters 14.

A microcontroller 22 connected to the reactors and other components of the multi-stage reformer measure the process variables, receives inputs at various stages from the multi-stage reformer 18, and controls devices therein for controlling the chemical kinetics in each stage of the device. Controller 22 allows varying input gas flow rates and concentrations, stage heating and cooling rates, and overall product throughput controls including temperature and pressure in each stage. The multi-stage reformer 18 uses electronically controlled proportional valves, temperature and pressure sensors, and chemical composition state estimators as well as control algorithms known in the chemical processing art for communication with controller 22. A combination of traditional and known control strategies for chemical processes include, but are not limited to, linear estimators, Kalman filtering, adaptive tuning or the like, and neural network and/or fuzzy logic control techniques may be used in the controller 22 for the multi-stage reformer 18. Microcontroller 22 is also connected to an engine control unit 24 and communicates therewith. The engine control unit 24 may be connected to a plant controller 26 when the present invention is employed in a power plant or industrial type application.

The engine control unit 24 for the present invention is preferably a high-performance embedded controller that allows for cylinder-to-cylinder control of the combustion process in the diesel-type engine 12. Engine control unit 24 controls the timing and volume of the autoignition substance, timing and flow rate of the natural gas injection, and other control variables typically found in an engine depending on the specific engine configuration. This can include variable valve timing, waste-gate control of the turbocharger, and variable volume control in the turbocharger. In cases where an independent air management system is employed such as in an electrically driven supercharger, that set of variables may also be controlled by the engine control unit 24. In the preferred embodiment, the engine control unit 24 receives a plurality of inputs from sensors such as a knock sensor 28, temperature sensor 30, speed or RPM sensor 32, and/or vibration sensor 34.

The control algorithms employed in the present invention are known in the vehicle industry and are capable of fully autonomous optimization based on several of the criteria with weighted importance. The optimal controller uses pattern recognition and neural network technology to continuously update the plant or vehicle based on operational engine performance measurements. A look-ahead control scheme allows for continuous search of accessible control space to calculate the optimal present and future control strategy with known algorithms. Suitable control algorithms include an underlying conventional, linearized-theory (with Kalman estimator) structure.

Additionally, control unit 24 can perform a real-time estimation of emission levels in the engine exhaust stream to address environmental concerns. A continuous emission monitoring (CEM) sensor is employed where compliance with air quality may be required.

Figure 2:
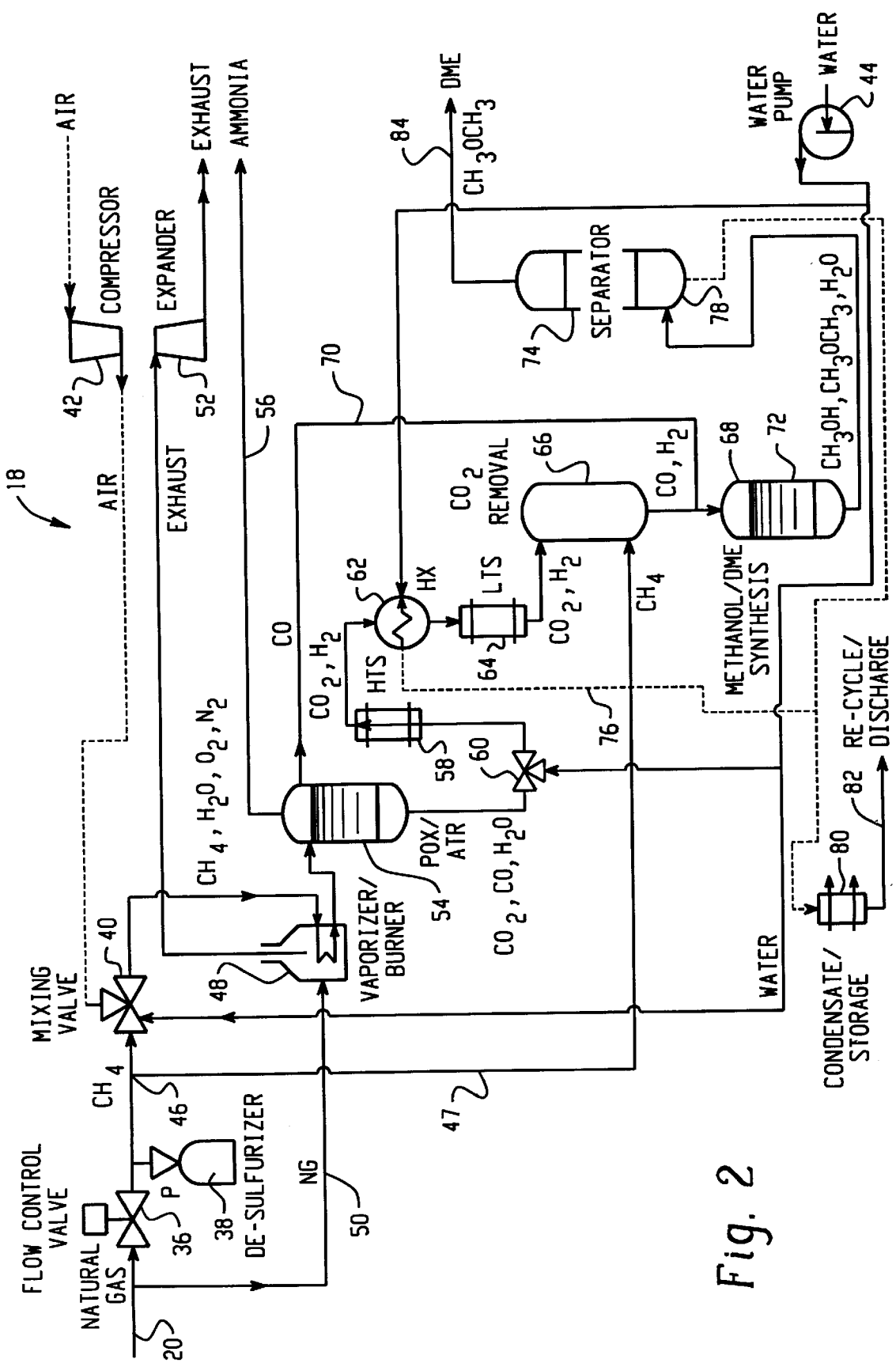
FIG. 2 is a schematic flow diagram of the DME multi-stage reformer.

Referring now to FIG. 2, there is shown a flow diagram of the multi-stage reformer 18. A portion of the natural gas 20 used to operate the diesel-type engine 12 is passed through flow control valve 36 to a pre-reformer filter stage 38. The pre-reformer filter stage 38 provides contaminant clean up of the natural gas stream. Typically, a de-sulfurization process is used for a natural gas stream. By providing a pre-reformer filter stage, this allows a variety of feed streams (bearing varying percentages of methane, propane, and other ethanes; sulfur; and other trace contaminants) that are commonly found in commercial practice to be used in the multi-stage reformer. More extensive steps of the cleanup stage may be required when biogas, landfill gas, and other low-to medium-BTU gas streams are employed. Pre-reformer filter stage 38 is a conventional de-sulfurization process that uses existing equipment and standard practices. The filtered gas stream then flows through a mixing valve 40 where a gas such as air that is compressed by a compressor 42 may optionally be added and water supplied by water pump 44. Prior to the gas stream entering the mixing valve 40, a bleed stream of methane ($CH_4$) at a junction 46 is removed for a use which will be later described. The filtered natural gas flows through mixing valve 40 where air and water ($H_2O$) are added with the mixed gas stream being warmed in a vaporizer/burner 48. Burner 48 is operated from a bleed stream 50 of natural gas supplied directly from source 20. The exhaust stream generated by burner 48 consisting of typical combustion products is passed through an expander 52 for performing work such as providing mechanical power to a compressor or a power generator turbine or the like where it is eventually exhausted into the atmosphere.

The warmed gas stream enters the first reactor stage 54 which on a plant or industrial scale is preferably a reactor vessel lined with refractory materials to allow partial oxidation of the gas stream. This is an exothermic reaction and the process is performed adiabatically by simultaneously causing a steam reforming (SR) reaction to take place between injected water and methane. The by-products of the methane and water steam reforming reaction are carbon monoxide (CO), carbon dioxide ($CO_2$), and hydrogen ($H_2$). In the first reactor stage, methane is converted to form a synthesis gas which comprises primarily carbon monoxide and hydrogen.

When pure synthesis gas is required for certain applications, oxygen ($O_2$) may be used instead of air since the nitrogen in air can lead to the formation of ammonia in this stage. In some instances, ammonia is a potentially desirable by-product and so air is employed in the partial oxidation chamber. Any ammonia generated during this step may be diverted to an engine exhaust post-treatment system. There the ammonia will be mixed with the engine exhaust for reduction of $NO_x$ emissions. The ammonia exits the top of the reactor by way of line 56. The stream exiting the bottom of the first reactor stage 54 comprises a mixture of $CO_2$, CO, $H_2$ and $H_2O$. In the preferred embodiment, this stream undergoes a high-temperature watershift reaction 58 to combine the CO and $H_2O$ for generation of $CO_2$ and $H_2$. Preferably, a mixing valve 60 is positioned between the first reactor stage 54 and the high temperature water-shift reactor 58 for mixing water into the process stream. After the stream passes through the high temperature water-shift reactor 58, the stream flows through a heat exchanger 62 where the stream is cooled and further subjected to a low temperature water-shift reaction in reactor 64 for further reaction. The process stream now containing primarily $CO_2$ and $H_2$ enters the reactor 66 which removes the $CO_2$ from the gas stream. Methane from junction 46 is supplied as a filtered gas stream along line 47 to reactor 66. Methane is combined with the carbon dioxide in a lower region of reactor 66 to form carbon monoxide and hydrogen. The gas stream containing principally carbon monoxide and hydrogen exits the bottom of reactor 66 and next enters the upper region of a third reactor stage 68 which also receives a bleed stream of carbon monoxide in its upper portion from the top of the first reactor stage 54. In the third reactor stage 68, carbon monoxide bleed stream 70 and the hydrogen from the second reactor stage 66 are combined over a catalyst within a separate adiabatic reactor 72 therein for production of methanol ($CH_3OH$). There are many catalysts known for the conversion of a synthesis gas to methanol which is the starting material for DME. A copper/zinc/chromium catalyst combined with alumina described in U.S. Pat. No. 4,098,809 is employed to form dimethyl ether from methanol. U.S. Pat. No. 4,417,000 says that it is known that the addition of alkali metals to such a catalyst kills the selectivity of the catalyst to dimethyl ether and causes the production of methanol. U.S. Pat. No. 4,417,000 discloses a physical mixture of two catalyst components which produces a high yield of dimethyl ether from a synthesis gas. This patent is hereby incorporated by reference. If desired, the use of a dual function catalyst produces both methanol and DME at the same time. The amount of methanol that forms DME is a function of the temperature, pressure, catalyst and residence time in the chamber 72.

The final stage in the multi-stage reformer 18 is a separator or a separation stage to remove any unwanted impurities from the stream containing primarily DME, methanol and water. Combustion with DME can occur at water concentrations as high as ten percent (10%) on a volume basis, and with methanol concentrations as high as seven percent (7%) on a volume basis. Since the DME is used as the autoignition source, moderate methanol and water contamination is acceptable. The water and methanol limits are determined by the design of the fuel injection system and by how much the atomization pattern is affected.

The multi-stage reformer 18 can include several subsystems and components, for example, flow control valve 36 which is preferably responsive to microcontroller 22. Valve 36 regulates the flow of natural gas into the reformer 18. As noted earlier, mixing valve 40 mixes the natural gas/stream with water, and compressed air for feedstock into the first reactor stage 54. The vaporizer/burner 48 preheats the mixture before the first reactor stage 54. The exhaust from the vaporizer/burner 48 can be used to drive the expander 52/compressor 42 that provides the inlet air stream to the mixing valve. A water pump 44 is preferably employed to provide feedwater to mixing valve 40, the pre-HTS mixing valve 60, and cooling medium for the heat exchanger 62. Condensate lines 76, 78 shown as dashed lines collect the effluent from the heat exchanger 62 and separator 74 for re-use and disposal in condensate storage container 80 which through line 82 may be either recycled and/or discharged. The DME produced from the multi-stage reformer 18 exits the reformer on line 84 and may be stored in a container 86 as seen in FIG. 1 or alternatively fed directly to a DME fuel pump 16 for injection.

The autoignition substance, which is preferably DME, is used with a fuel injection system designed to handle the fluid dynamic properties of the autoignition substance. The injector pump 16 feeds the autoignition substance to the microigniters 14. The microigniters 14 increase the pressure of the autoignition substance and inject the fluid into the cylinder in a timed pulse that is precisely metered as is known with conventional fuel injection systems of the autoignition kind. The ability to control the volume and timing of the microigniter pulse allows for precise control of the combustion dynamics of the engine 12. This increases the thermal efficiency of the engine and controls exhaust emissions to acceptable levels. The control variables at this stage are absolute or relative timing on a cylinder-by-cylinder basis; pulse shape; pulse volume; and pulse duration. All of these variables are controllable with the engine control unit 24 working and operating in conjunction with microcontroller 22.

Figure 3:
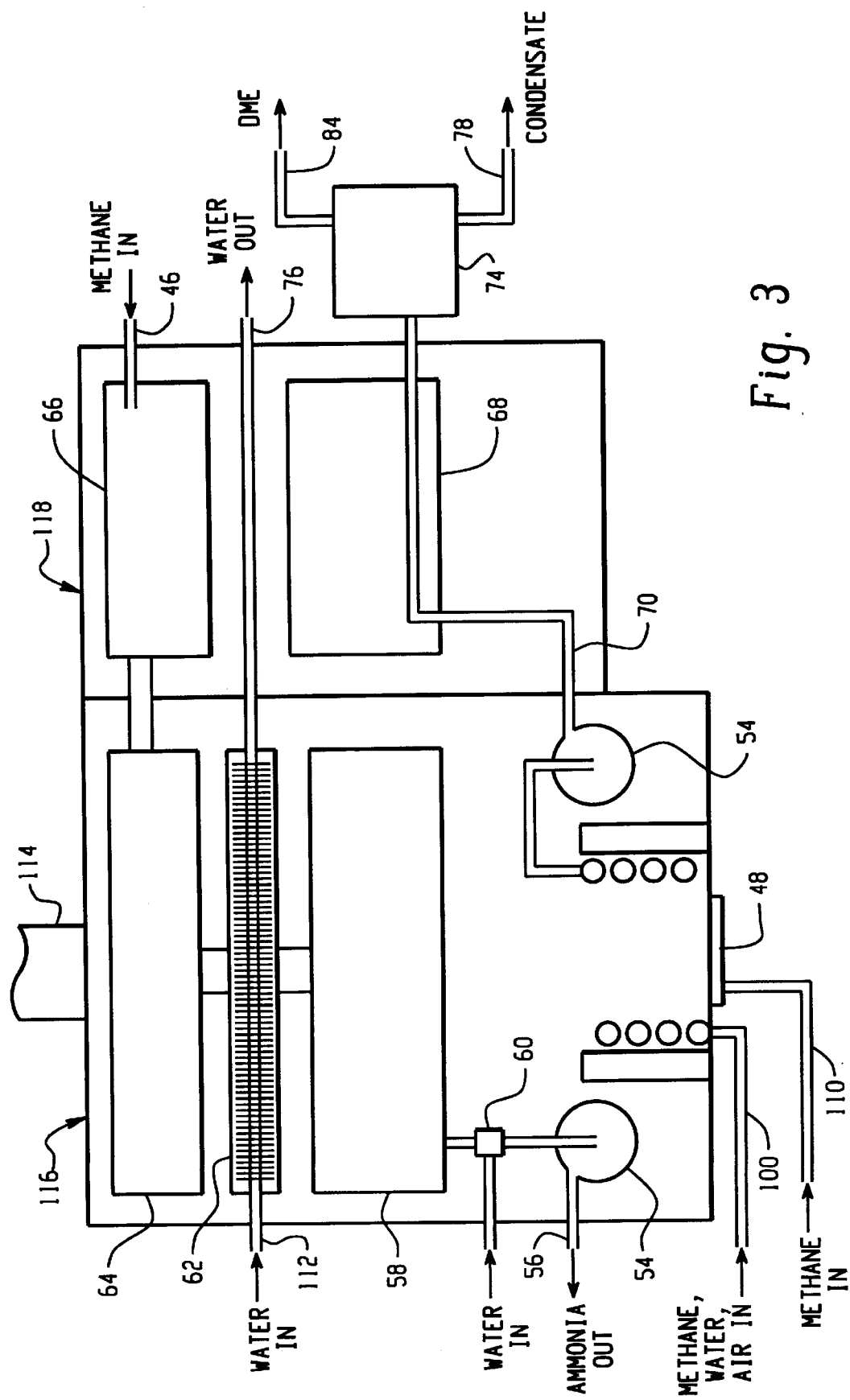
FIG. 3 is a schematic DME multi-stage reformer layout diagram.

Turning next to FIG. 3, there is shown a multi-stage reformer layout diagram in accordance with the present invention. As depicted in this figure, the components of the multi-stage reformer 18 are preferably modular and suitable for application in a mobile diesel engine, but are equally applicable to a stationary diesel engine. The natural gas stream flows through mixing valve 40 where water and air are mixed in. This mixture enters in line 100 and the stream is warmed by the burner 48 and the vaporizer channels therein. The vaporizer/burner 48 pre-heats this mixture before the process stream enters the first reactor stage 54. A portion of the natural gas from the supply 20 is supplied to the burner by way of line 110 as fuel for the burner.

In the first reactor stage 54, any ammonia generated is diverted via line 56 to an engine exhaust post-treatment system where it may be mixed with engine exhaust gas for thermal or catalytic $NO_x$ reduction. Mixing valve 60 supplies feedwater from water pump 44 to the stream prior to the stream entering the high temperature water-shift reactor 58. As the stream exits the high temperature water-shift reactor 58, it is cooled with heat exchanger 62. Feedwater from pump 44 (seen in FIG. 2) acts as the cooling medium for the heat exchanger 60 flowing in through line 112 and out condensate line 76 where it is collected in the condensate storage 80 as best seen in FIG. 2. The cooled stream then enters the low temperature water-shift reactor 64 where carbon monoxide and water are combined to generate carbon dioxide and hydrogen. The second reactor stage 66 removes the carbon dioxide from the gas stream by forming carbon monoxide and hydrogen gas through the addition of methane from line 46. The synthesis gas stream (CO and $H_2$) next enters the third reactor stage 68 and is combined with carbon monoxide from bleed stream 70 to form methanol and preferably primarily DME. This stream of autoignition materials then passes through separator 74 and is the autoignition substance consisting predominantly of DME, some methanol and water. The autoignition substance goes either directly to fuel injection pump 16 or to an accumulator or storage container 86. The condensate from the separator is sent via line 78 to a storage for recycle and/or discharge. As depicted in FIG. 3, first, second and third reactor stages as well as the high and low temperature water-shift reactors and heat exchangers are contained in a modular configuration which is preferably a thermally controlled system. While FIG. 3 shows two separate thermal control systems 116, 118, it is understood that a single thermal control system or module may be used Alternatively, it is envisionable that a plurality of thermal control modules may be employed for a rugged, space efficient module suitable for mounting on a vehicle, or wherever desired.

The chemical reactions and reactors employed in the present invention are devices known in the art, and in particular the fuel cell reformer community.

The control scheme proposed is intended to preferably allow operation in the non-linear chemical kinetics regime.

The first stage of the reformer is an equilibrium form of steam reformation of methane and will be performed in the presence of a nickel-based catalyst. In that stage, three reactions occur:

$$CH_4+H_2O \rightarrow CO+5H_2$$

$$CO+H_2O \rightarrow CO_2+H_2$$

$$CO+3H_2 \rightarrow CH_4+H_2O$$

This reaction will use a steam to carbon ratio of between about 3 and about 5 and operate at approximately 815° C. and approximately 3.5 MPa.

The HTS and LTS reactions are:

$$CO+H_2O \rightarrow CO_2+H_2$$

The HTS and LTS will both occur in the presence of a catalyst. That is probably a nickel-based catalyst but there are several options as to choice of catalyst at that stage. The temperature of the HTS will be in the range of approximately 500–600° C. and the LTS temperature range is approximately 150–250° C. The pressure is dependent upon the temperature (and vice versa) in the nonlinear, non-equilibrium control schemes and will be in the range of approximately 0.5–2.5 MPa.

In the C02 removal stage, the following reaction takes place:

$$CO_2+CH_4 \rightarrow 2CO+2H_2$$

This also occurs in the presence of a catalyst and the temperature and pressure are in the ranges of approximately 350–500° C. and approximately 0.5–2.5 MPa, respectively. The methanol/DME synthesis stage is a controlled process where the methanol production is minimized and the intermediate production of DME is increased. The ratio of DME to methanol depends upon the temperature, pressure, catalysts, and residence time. The expected reaction is:

$$2CO+5.5H_2 \rightarrow 0.1CH_3OH+0.9CH_3OCH_3+H_2$$

The temperature and pressure will be in the range of approximately 250–450° C. and approximately 0.5–2.0 MPa, respectively.

While specific embodiments of the invention have been shown and described in detail to illustrate the application of the principles of the invention, it will be understood that the invention may be embodied otherwise without departing from such principles.

What is claimed is:

1. An apparatus for generating an autoignition product for operating a diesel-type engine with natural gas as a primary fuel, comprising:
   a supply of natural gas;
   a reformer constructed to receive a portion of natural gas from said supply and process the portion of natural gas, said reformer producing an autoignition product from the portion of natural gas;
   a pump connected to said reformer for receiving the autoignition product and supplying the autoignition product to at least one microigniter in a diesel-type engine constructed to operate with natural gas as a primary fuel; and
   a controller in communication with said reformer and said pump for receiving input signals therefrom and providing output signals thereto for generating a desired amount of the autoignition product for supply to at least one microigniter in the diesel-type engine, wherein the diesel-type engine operates with natural gas as the primary fuel without a spark ignition source.

2. An apparatus as recited in claim 1, wherein said reformer comprises a plurality of reactors.

3. An apparatus as recited in claim 2, wherein the autoignition product comprises DME.

4. An apparatus as recited in claim 1, further comprising a pre-reformer filter for filtering contaminants from the natural gas.

5. An apparatus as recited in claim 4, wherein said reformer comprises:
   a first reactor receiving the filtered natural gas from said pre-reformer filter, said first reactor converting methane in the natural gas to synthesis gas;

at least one water-shift reactor stage for combining some of the carbon monoxide and water in the synthesis gas to form carbon dioxide and hydrogen;

a second reactor connected to the at least one water-shift reactor and receiving the carbon dioxide and hydrogen therefrom, said second reactor further being connected to said pre-reformer filter for receiving a portion of filtered natural gas therefrom for reacting methane in the filtered natural gas with the carbon dioxide to form carbon monoxide and hydrogen;

a third reactor connected to said first reactor and receiving a carbon monoxide bleed stream therefrom, said third reactor further being connected to said second reactor and receiving carbon monoxide and hydrogen therefrom, said third reactor further including a catalyst for producing DME; and a separator connected to said third reactor for removing impurities and supplying DME to said pump.

6. An apparatus as recited in claim 5, wherein said first reactor comprises a partial oxidation reactor constructed to receive water for a steam reforming reaction between water and the methane in the natural gas, said partial oxidation reactor further being constructed to receive air to form ammonia.

7. An apparatus as recited in claim 5, wherein said first reactor comprises an autothermal reactor having a catalyst therein for reducing temperature and pressure requirements for making synthesis gas, said autothermal reactor being constructed to receive water for a steam reforming reaction and oxygen for forming synthesis gas.

8. An apparatus as recited in claim 5, wherein said at least one water-shift reactor comprises a high temperature shift reactor connected to a low temperature shift reactor.

9. An apparatus as recited in claim 5, further comprising a mixing valve positioned between said pre-reformer filter and said first reactor, said mixing valve receiving the filtered natural gas and further being connected to a supply of air and a supply of water, said mixing valve being in communication with and responsive to said controller for regulating amounts of air, water, and filtered natural gas in a mixed stream supplied to said first reactor.

10. An apparatus as recited in claim 9, further comprising a burner situated between said mixing valve and said first reactor, said burner further being connected to said supply of natural gas prior to said pre-reformer filter for combusting a portion thereof and for heating filtered natural gas supplied therethrough to said first reactor.

11. An apparatus as recited in claim 10, further comprising a heat exchanger positioned between said high temperature shift reactor and said low temperature shift reactor for cooling the carbon dioxide and hydrogen supplied from the high temperature shift reactor to the low temperature shift reactor.

12. A method for producing an autoignition product for a diesel-type engine operating with natural gas as a primary fuel, comprising the steps of:

providing a supply of natural gas;

connecting a multi-stage reformer to the supply of natural gas and receiving a portion of the natural gas therefrom for creating a natural gas stream;

making a synthesis gas stream from the natural gas stream in a first reactor stage of the reformer;

combining CO and $H_2O$ in the synthesis gas stream to form $CO_2$ and $H_2$ in at least one water-shift reaction stage connected to the first reactor;

removing $CO_2$ from the synthesis gas stream in a second reactor stage connected to the at least one water-shift reaction stage;

synthesizing DME and methanol from the synthesis gas stream in a third reactor stage connected to and receiving the synthesis gas stream from the second reactor stage;

separating impurities from the DME and methanol for providing the DME and methanol mixture as an autoignition product for a diesel-type engine; and operating the diesel-type engine with natural gas as a primary fuel without a spark ignition source.

13. A method as recited in claim 12, further comprising the step of filtering the natural gas stream prior to the multi-stage reformer.

14. A method as recited in claim 13, further comprising the steps of selectively mixing air and water into the filtered natural gas stream, and heating the filtered natural gas stream prior to supplying the mixture to the first reactor stage.

15. A method as recited in claim 14, further comprising the step of cooling the synthesis gas stream prior to the $CO_2$ removing step.

16. A method for operating a diesel-type engine with natural gas as a primary fuel using an autoignition product generated in situ, comprising the steps of:

providing a diesel-type engine;

providing a supply of natural gas, the supply of natural gas being connected to the diesel-type engine;

connecting a multi-stage reformer to the natural gas supply for removing a portion of natural gas therefrom for a process stream;

producing an autoignition product from the process stream with the multi-stage reformer in situ;

providing a pump connected to the multi-stage reformer, the pump being connected to a plurality of microigniters in the diesel-type engine;

controlling an amount of the autoignition product supplied by the pump to the microigniters; and operating the diesel-type engine with natural gas as a primary fuel without a spark ignition source.

17. A method according to claim 16, wherein the producing step comprises the steps of:

filtering the process stream from contaminants;

mixing air and water into the process stream;

partially oxidizing the process stream to form synthesis gas;

reacting the synthesis gas in a water-shift reaction for combining CO and $H_2O$ to generate $CO_2$ and $H_2$;

removing $CO_2$ from the generated $CO_2$ and $H_2$ as the synthesis gas stream;

producing methanol and DME from the synthesis gas stream with the addition of a CO bleed stream; and separating any unwanted impurities.

18. A method according to the claim 17, wherein the controlling step further comprises the steps of controling equilibrium and non-equilibrium chemical kinetics in each stage of the multi-stage reformer.

19. A method according to the claim 18, wherein the controlling step further comprises the steps of varying input gas flow rates and concentrations, stage heating and cooling rates, and temperature and pressure in each stage.

* * * * *